United States Patent [19]
Kanzelberger

[11] 4,125,655
[45] Nov. 14, 1978

[54] DECORATIVE PLAQUES AND PROCESS
[75] Inventor: James C. Kanzelberger, Riverside, Ill.
[73] Assignee: Contemporary, Inc., River Forest, Ill.
[21] Appl. No.: 770,797
[22] Filed: Feb. 22, 1977

Related U.S. Application Data

[63] Continuation of Ser. No. 579,419, May 21, 1975, abandoned, which is a continuation-in-part of Ser. No. 454,166, Mar. 25, 1974, Pat. No. 3,940,864.

[51] Int. Cl.² .................... B44C 1/28; B32B 3/00; G09F 7/00
[52] U.S. Cl. .................... 428/67; 40/616; 101/32; 156/220; 156/230; 156/233; 156/235; 156/250; 156/267; 427/148; 427/270; 427/275; 428/13; 428/173; 428/207
[58] Field of Search .................... 428/13, 14, 67, 172, 428/173, 199, 207; 156/219, 220, 230, 233, 235, 250, 251, 267, 268; 427/147, 148, 256, 270, 271, 275; 101/32; 40/135, 136, 160

[56] References Cited

U.S. PATENT DOCUMENTS

| | | | |
|---|---|---|---|
| 3,212,542 | 10/1965 | Miller et al. | 156/268 |
| 3,480,500 | 11/1969 | Hotter | 156/233 |
| 3,510,388 | 5/1970 | Hunt et al. | 40/136 |
| 3,770,479 | 11/1973 | Dunning | 156/232 |
| 3,822,494 | 7/1974 | Zivica | 40/160 |
| 3,940,864 | 3/1976 | Kanzelberger | 428/40 |
| 4,012,552 | 3/1977 | Watts | 156/233 |
| 4,047,996 | 9/1977 | Kanzelberger | 156/220 |

*Primary Examiner*—William R. Dixon, Jr.
*Attorney, Agent, or Firm*—Laff, Whitesel & Rockman

[57] ABSTRACT

Low cost decorative award plaques are provided which use a plastic laminate article capable of being hot stamped with desired lettering or designs. The plaque is made by a process of repeatedly imprinting with different colors and surface effects. The process includes forming and cutting the plastic on a rigid backing, especially one simulating a fine, hardwood panel.

12 Claims, 19 Drawing Figures

DECORATIVE PLAQUES AND PROCESS

BACKGROUND OF THE INVENTION

This is a continuation of application Ser. No. 579,419, filed May 21, 1975, now abandoned, which is a continuation-in-part of my copending application Ser. No. 454,166, filed Mar. 25, 1974, now U.S. Pat. No. 3,940,864.

This invention relates to decorative and award plaques made from a plastic article, suitable for imprinting by a hot-stamping process and to methods for manufacturing and using these plaques.

Decorative and award plaques are used to personalize many items, such as trophies given as recognition of an achievement. Usually, these plaques have plates which contain a symbol, picture, or device, the recipient's name, and other pertinent information. Other uses for such plaques may include personalized desk sets, and works of art. Heretofore, most aesthetically acceptable plaques have been produced on a metallic material, usually gold or silver color plates. Generally, these plaques have been imprinted by engraving or etching methods.

For convenience of expression, the term "lettering" is used hereinafter to mean any form of a letter, numeral, design, logotype, trademark or the like, which may be printed, embossed or debossed as described herein.

Although the plaques made by the conventional engraving method have high aesthetic qualities, they are limited in fineness of detail and often lack contrast between the imprinted lettering and the remaining surface of the plate. As a result, it may be difficult to read the lettering. In metal plates, an oxidation process may be employed to obtain certain forms of contrast, but often the extra cost is prohibitive.

Sometimes plaques are formed by silk-screening wherein a squeegie forces coloring matter, such as ink, paint, or dye, onto the plaque through the meshes of a silk or organdy screen having areas impervious to the ink. Although there may be a high degree of visibility and contrast between the lettered and the remaining portions of the plaque, the high quality appearance of an engraved metal plate is not achieved. Another disadvantage of the silk-screen method is that it is impractical to personalize individual plaques, because a long set-up time is necessary to prepare the silk screen. Consequently, the set-up time and cost may be prohibitive when printing only one plaque.

A major problem with both the engraving and the silk-screening methods of plaque-making is that skilled persons are required. Thus, neither of these methods is appropriate for immediate use by the general retail trade. The additional time and handling required to send the work to such skilled persons, together with the concomitant increased cost, eliminates many sales and lessens "impulse" purchases which are important in the retail marketing of a relatively low-cost item with an engraved plate.

Another method for imprinting on objects is hot-stamping, but the conventional hot-stamping, as on paper, leather, and plastic and the like, does not achieve a high quality engraved-like, debossed effect.

Accordingly, an object of the present invention is to provide improved plaque articles, especially those having surfaces which have the appearance of metal and can be imprinted or otherwise formed by a hot-stamping process. Another object is to provide plaques with surfaces which have metallic-like and contrasting appearances and which can be imprinted by a hot-stamping method to achieve a high color contrast and a debossed character, comparable to the character of an engraved metal plate.

Another object of the present invention is to provide methods of imprinting a plaque which may be performed at the point of sale by persons having no special training. Still another object of the invention is to provide processes for producing blank plaques which may be debossed with high contrast and superior aesthetic qualities, at a low cost, by such persons having no special training. Another object is to provide a plaque which may be quickly, readily, and inexpensively manufactured, even on a single plaque basis.

SUMMARY OF THE INVENTION

In one exemplary form, the invention may be a plaque of a preselected size and shape having a wood grain surface thereon. A plastic layer may be cemented to the wood grain to be colored by one or more hot-stamping foils. By repeated stamping, a plaque may be given a progressively more attractive appearance. For example, a gold-colored background plate may have a silver-colored insert with, say black and red lines apparently engraved thereon. The end product plaque has excellent aesthetic properties well adapted to uses such as awards, commemorative keepsakes, trophies, etc.

In one form, the process for manufacturing the plaques according to this invention comprises cutting and edge painting a board (such as flake board), laminating one surface with wood grain vinyl, and adhering thereover a foil-covered plastic which may be debossed. Then, the foil-covered plastic is cut to a desired size and shape. The cutting is done in such a manner (usually by a steel rule die shaped on one side only) as to eliminate an edge which could be caught and lifted by a fingernail.

BRIEF DESCRIPTION OF THE DRAWINGS

The nature of the invention may be understood more fully by reference to the drawings wherein.

DESCRIPTION OF THE PREFERRED EMBODIMENTS

The following principles shown in FIGS. 1–7 and described herein are set forth in my copending patent application Ser. No. 454,166.

Figure 3:
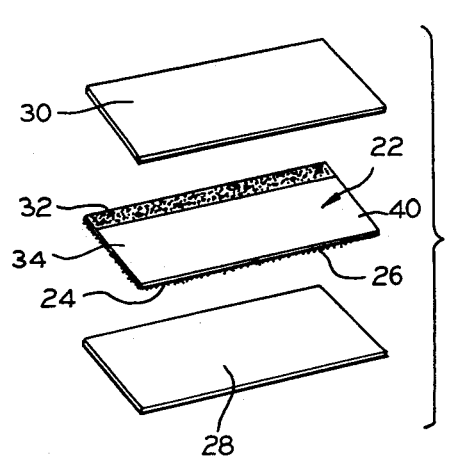
FIG. 3 is an exploded view of the layers of the article of FIG. 1.
Figure 1:
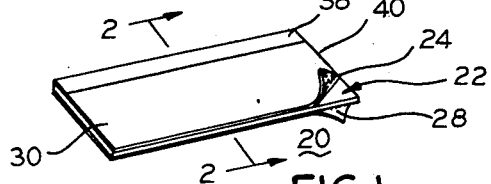
FIG. 1 is a perspective view of one embodiment of an article made according to this invention.
Figure 2:
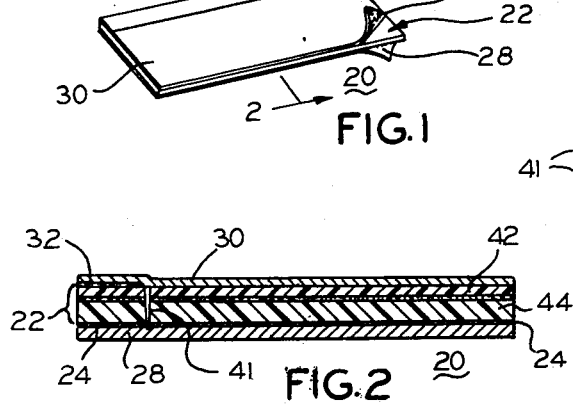
FIG. 2 is a cross-sectional view taken along line 2—2 of FIG. 1.

As illustrated in FIGS. 1–3, the article 20 comprises a plastic pad 22 of a preselected size and shape, preferably having a pressure-sensitive adhesive 24 on the back 26 of the pad 22. The adhesive coating 24 is covered by a backing sheet 28, which is chemically treated, such as by silicone or wax to provide a release surface.

A hot-stamping foil 30 is superimposed over a plastic plate 40 forming a major part of the pad 22. A second adhesive coating 32 is located on an appendage 38 on the front 34 of the pad 22, to hold in place the hot-stamping foil 30. Other suitable means, such as stapling, may also be employed for retaining the foil 30 on the pad. The appendage 38 is separated from the remainder or plate portion 40 by means of a slit 41. The backing sheet 28 maintains the appendage portion 38 in its original contiguous relationship with plate portion 40 so that the entire article 20 is self-contained during the hot-stamping operation.

Figure 4:
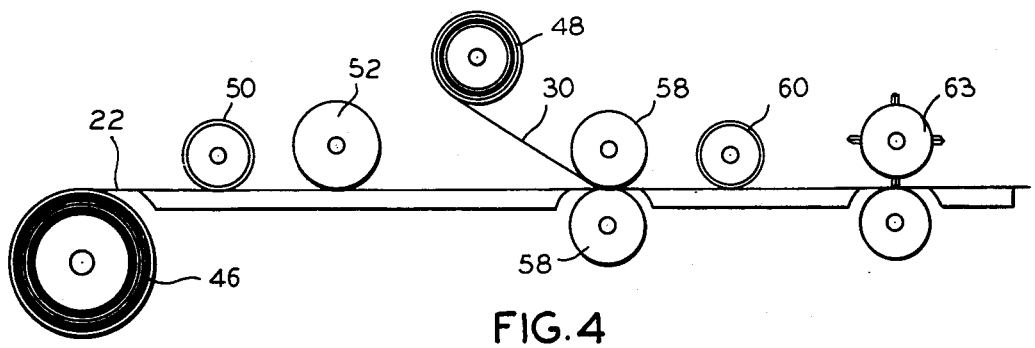
FIGS. 4 and 5 schematically illustrate an exemplary method and apparatus for manufacturing the article of FIG. 1.

The pad 22 comprises a decorative polyester film 42 laminated on a thermoplastic material 44 (FIG. 4). Applicant has found "metallized" MYLAR to be a satisfactory polyester film (MYLAR is a trademark for polyester film of the du Pont Company). "Metallized" MYLAR which may have the aesthetic properties of gold or silver, for example, is readily available from various manufacturers, such as the Flexcon Company, Inc.

The thermoplastic material 44 should be readily formable through an application of moderate heat and pressure, and a pressure-sensitive adhesive should adhere to it. The film 44 should also be sufficiently rigid to function as a printable plate. Applicant has found rigid polyvinyl chloride to be satisfactory.

In one form, article 20 was constructed using a pad 22 of MYLAR film having a thickness ranging from $\frac{1}{2}$ to 1 mil and rigid vinyl with a thickness of about 8 mils. Within this range, applicant has found that the pad 22 was sufficiently rigid and thick to withstand hot-stamping and to provide a suitable imprinting surface.

For the adhesive backing 24, a number of compositions, generally known as "pressure-sensitive adhesives", can be used. These are various blends of natural and synthetic rubbers with resins, polyvinyl acetates, ehtylene-polyvinyl acetate copolymers (EVA), polyterpenes, hydrogenated resins, resin ester, acrylics, chlorinated paraffins, ethyl cellulose, and a variety of other substances. Common and well-known types of pressure-sensitive adhesive are exemplified by those used on transparent cellophane adhesive tapes. These materials may be applied as solutions using solvents such as naphthas, toluene, chlorinated hydrocarbons, and the like. An important property is that the adhesive be capable of adherence to metal, wood and other types of surfaces used for the products to which the plates of this invention are intended to be attached. The protective cover 28 may be paper, plastic, or other suitable material having desirable releasing properties.

The hot-stamping foil 30 inches includes a carrier supporting a coloring matter such as ink. Generally, the carrier may be MYLAR, cellophane or acetate, or the like. The foil is available in many colors so that various degrees of contrast between the lettering and the remaining plate surface may be achieved. Distributors of suitable hot-stamping foils include Howard Corp., Franklin Corp., and Kingsley Corp.

It should be noted that the rectangular shape of product 20 in this embodiment is merely an example, and the invention is not limited thereto.

Figure 5:
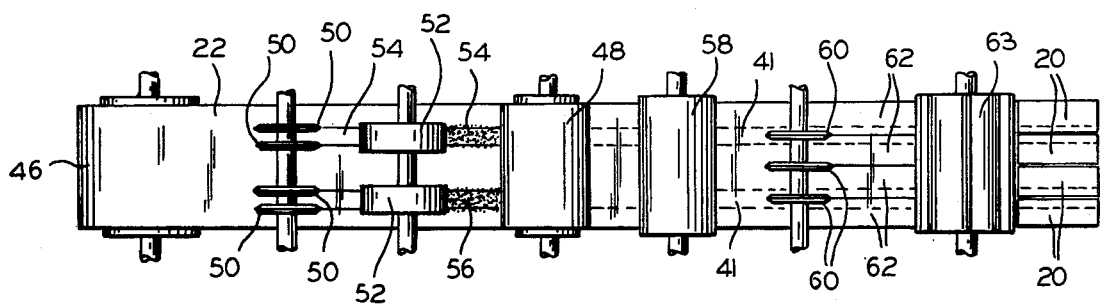
Figure 6:
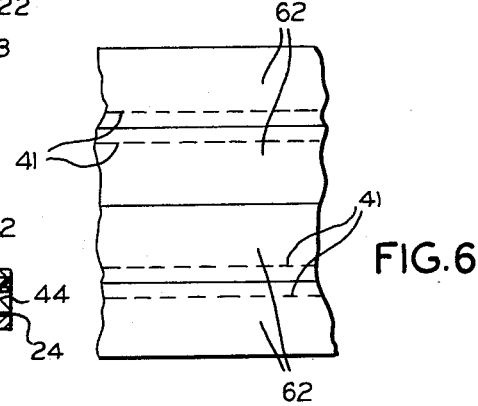
FIG. 6 is a fragmentary view of the article of FIG. 1, as it appears during the process of manufacture illustrated in FIGS. 4-5.
Figure 8:
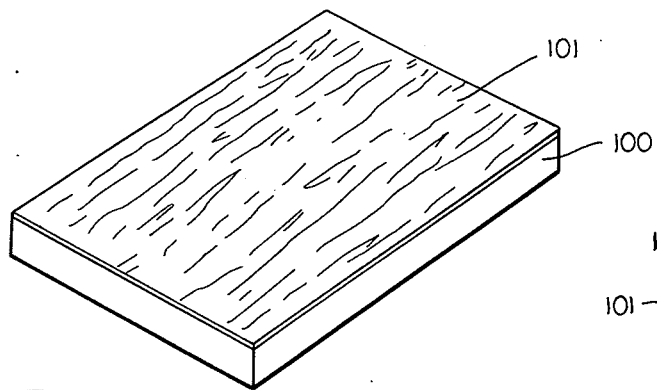
FIG. 8 is a perspective view of a blank plaque having a wood grain surface.
Figure 9:
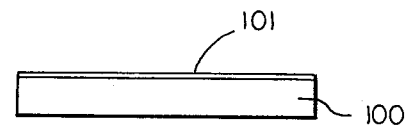
FIG. 9 is an end view of the plaque of FIG. 8.

FIGS. 4–6 disclose an exemplary method of manufacture which may be used to produce the article of this invention. The method illustrated may be performed on a Webtron Printing Machine.

In the preferred embodiment, the pad 22 having adhesive 24 on one side protected by the backing paper 28 is first manufactured in any convenient manner and rolled into a supply roll 46. Likewise, the hot stamping foil 30 is manufactured in any conventional manner and rolled into supply roll 48.

In one form, the width of the material 22, 30 on each of the supply rolls 46, 48, respectively, is $4\frac{1}{2}$ inches. This material is slit into four ribbons or strips 62 which are $1\frac{1}{8}$ inches wide. Each strip 62 includes plate material 40 which is $\frac{7}{8}$ inch wide and appendage material 38 which is $\frac{1}{4}$ inche wide. The finished product 20 is thus $1\frac{1}{8}$ inch wide, and the imprinted plate is $\frac{7}{8}$ inch wide.

The plastic laminate web 22 is drawn from supply roll 46 under slitters 50 which cut only through the pad 22. The backing paper 28 is not cut; it remains intact. Next, adhesive impregnated rollers 52 apply adhesive between the cut or slitted areas 54, 56. The supply roll 48 of hot-stamping foil 30 is drawn into contact with the adhesive-coated laminated material 22. Pressure roll 58 aids in assuring adhesion of hot-stamping foil 30 to the slitted areas 54 and 56 of the platic laminate 22.

Cutting wheel 60 longitudinalllly divides the web into the four strips 62. Transverse cutting wheel 63 divides the strips 62 into the completed articles 20. It should be noted that the rectangular article 20 could be die cut into other desired shapes by suitable die-cutting apparatus (not shown).

Figure 7:
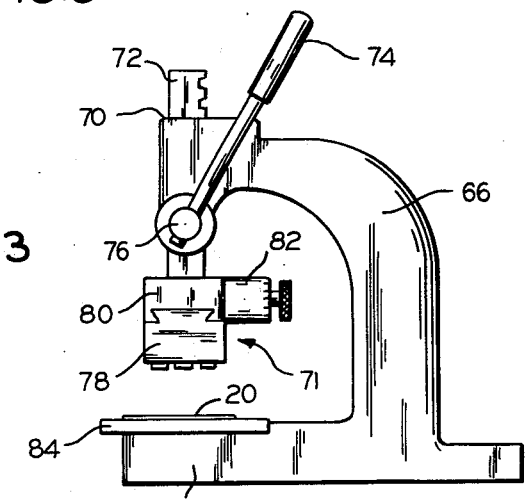
FIG. 7 is a side view of a hot-stamping machine capable of imprinting the article of FIG. 1.

The article 20 may be hot-stamped on a conventional hot-stamping machine 69, as illustrated in FIG. 7. The machine 69 comprises support member 66 suitably mounted on base member 88. The upper portion of the support member 88 has a ram-receiving aperture 70. Stamping means 71 includes a spring-biased ram 72 slidably mounted within ram-receiving aperture 70 and articulated by handle 74 through gear means 76. A heat conductive-type stick 78, containing preselected type, is mounted on a heat conductive mandril portion 80 of ram 72. A heating means 82 supplies thermal energy to the type stick 78.

After the type has been set and the type stick 78 has been inserted into the mandril portion 80, the article 20 is aligned by suitable means on base plate 84. Responsive to the activation of handle 74, stamping means 71 is forced downwardly onto article 20 and heat is concurrently applied, thereby debossing the article 20 while transferring ink from the hot-stamp foil to the debossed letters. The temperature and time at which the stamping operation is carried out are related functions. If the temperature is increased, the time of contact between the stamping means and the object being stamped may be decreased or increased. It has been found that a hot stamp temperature range of between 150° and 300° will give satisfactory debossing results. At these temperatures, the time range may vary from a fraction of a second to 3 seconds. At a temperature of 250° F., a stamping time of between 1 and 1½ seconds is satisfactory. The hot-stamping foil 30 selected for this process should accommodate the temperatures used and the materials being stamped.

A further function of the stamping operation is the pressure applied to the stamping means. In hand-operated stamping equipment, normal hot-stamping pressures may be satisfactorily applied. One of the advantages of applicant's process is that, where too little or too much pressure has been applied, measures can be taken to correct the plate being imprinted. If the operator exceeds the proper pressure or stamping time, either a conventional burnishing stick or a cleaning fluid may be rubbed over the surface of the plate to remove excess ink. If the operator uses too little pressure or time, the plate may be easily corrected by restamping.

Once the article 20 has been hot-stamped, the backing sheet 28 is removed and the plate portion 40 is separated from appendage portion 38 and foil 30 (as best illustrated in FIG. 3). The plate portion 40 may then be applied to a plaque or other object.

Principles described in connection with the embodiments of FIGS. 1–7 are employed in the inventive plaque, and in the process for fabricating it. This plaque and process are described in FIGS. 8–19. Among other things, the inventive process includes the use of a hot-stamping machine, such as that shown in FIG. 7, and the product includes a laminate of polyester film on a thermoplastic material.

The invention has a wide application in many fields. For example, jewel boxes, cabinets, doors, picture frames, product housings, dashboards, trays, and many other things may be made by the described processes. Accordingly, as used herein, the term "plaque" is to be construed to cover all devices which may incorporate the designs, features, and processes described herein.

The first step in the process for making the inventive decorative or award plaque or other panel is to cover the surface of a rigid board 100 with a discrete finish coat 101 with decorative appearance having any suitably surface. While any of many different suitable materials may be used to make the plaque blank of FIG. 8, it is presently thought that a wood grain vinyl sheet 101 bonded to a flake board panel 100 is the best material. Any of various plaque sizes and shapes may be used, one exemplary plaque being 4 × 6 inches ×0.5 inch (10 × 15 × 1.3 centimeters).

Figure 10:
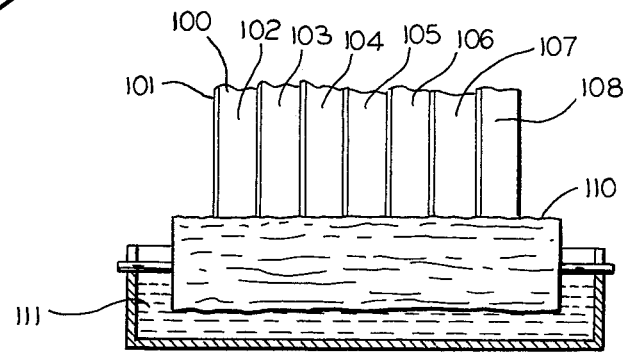
FIG. 10 is an end view of a plurality of blank plaques being edge painted by a roller partially immersed in a vat of paint.
Figure 11:
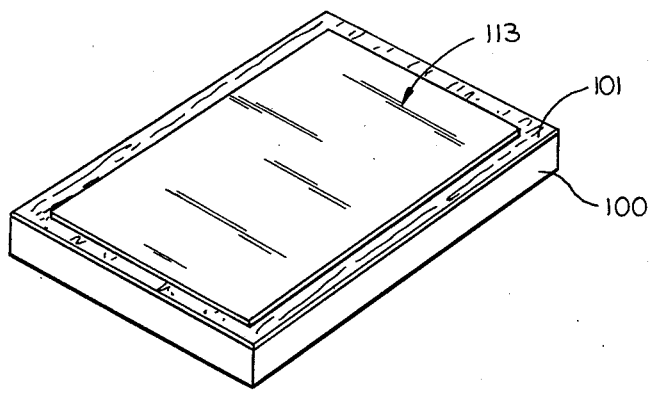
FIG. 11 is a perspective view of an edge painted blank plaque having adherent thereon a plastic sheet with a metallic appearing surface.
Figure 12:
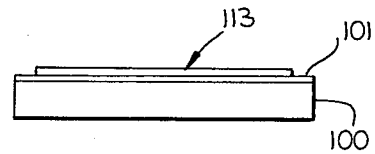
FIG. 12 is an end view of the plaque of FIG. 11.

After a suitable number of plaque blanks (FIGS. 8, 9) are cut to size, their edges are finished, in any suitable manner. For example, plaque blanks 102–108 are shown in FIG. 10 as being clamped together and passed over a roller 110 which is at least partialy submerged in any suitable paint or similar material 111. Thus, the edges of boards 107–108 are filled and painted or otherwise given an attractive end-product finish.

Figure 13:
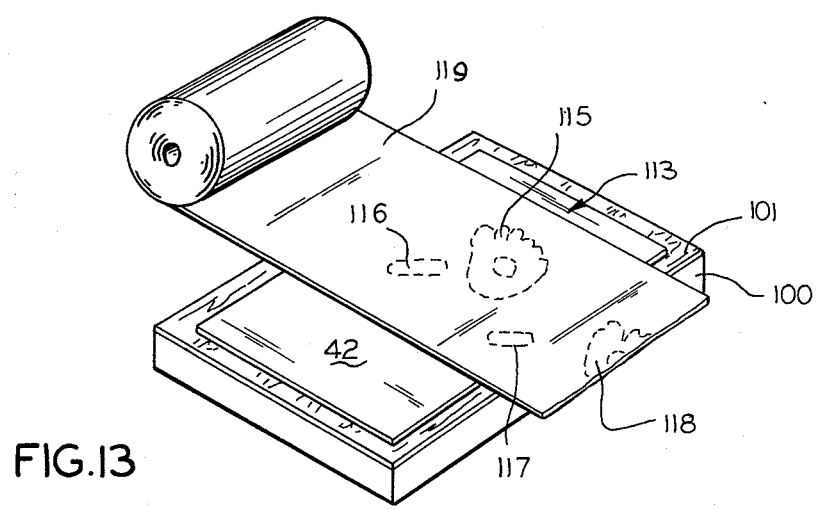
FIG. 13 is a perspective view of a hot stamping process for applying a contrasting design over the metallic appearing surface.

Next, a laminated sheet of plastic material 113 is bonded to the wood grain vinyl 101. This sheet 113 is essentially the same film-covered plastic material 44, 42 described above in connection with FIG. 2. If desired, the plastic material may have a brushed golden metallic appearance. Thereafter, an ink (perhaps silver) on a hot-stamping foil 114 is placed over, transferred and bonded to the metallic-like film surface 42, by a heating process. For example, in this particular drawing, the ink of a silver hot-stamping foil 114 is transferred in the general form of a baseball catcher's mit 115 and the tape 116 on a baseball bat handle. The outline 117, 118 of silver ink already removed from the foil 114 indicates that a previous plaque was stamped with the same general form. The next plaque to be made will receive a transfer of silver ink presently carried in the area 119 of the hot-stamping foil 114 (FIG. 13).

Figure 14:
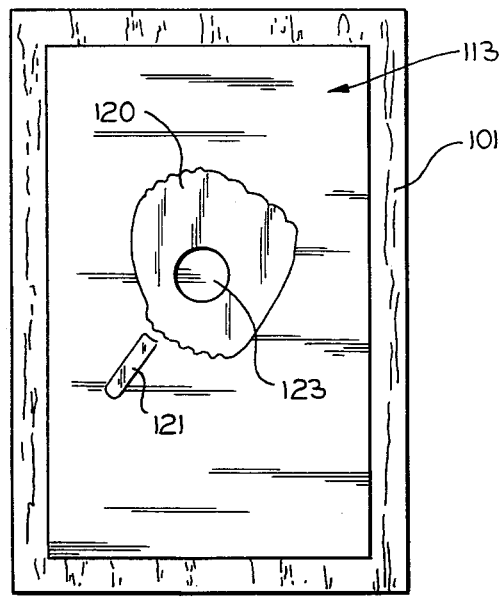
FIG. 14 is a plan view of the plaque after completion of the step of FIG. 13.

After the first hot-stamping ink transfer step (FIG. 13) is complete the plaque has the appearance shown in FIG. 14. In the described example, the appearance is a brushed gold surface 113 having polished silver surfaces at 120, 121. In this particular example, a brushed gold disc or circle 123 remains where no heat transfer occurred in the center of the silver patch 120.

The next step in the inventive process is to deboss the plaque of FIG. 14 and to deposit a colored ink which adheres to the decorative plastic film 113 in the debossments. Here, in this specific example, a number of black lines 124 are debossed to provide the details of a catcher's mit, a baseball bat, and a baseball. If desired, still more details could be added. For example, the baseball could be made white and its stitching could be debossed red lines. Obviously, the ultimate number of steps is limited only to the imagination, the desired design, and the acceptable limits of costs.

Simultaneously with the formation of the debossed lines 124, any suitable printing 125 may be formed. This printing could include a logo, a year, a person's name, or any other suitable message, such as, for example, "First Place". Likewise, any other suitable forms and styles of printing may be used.

Figure 15:
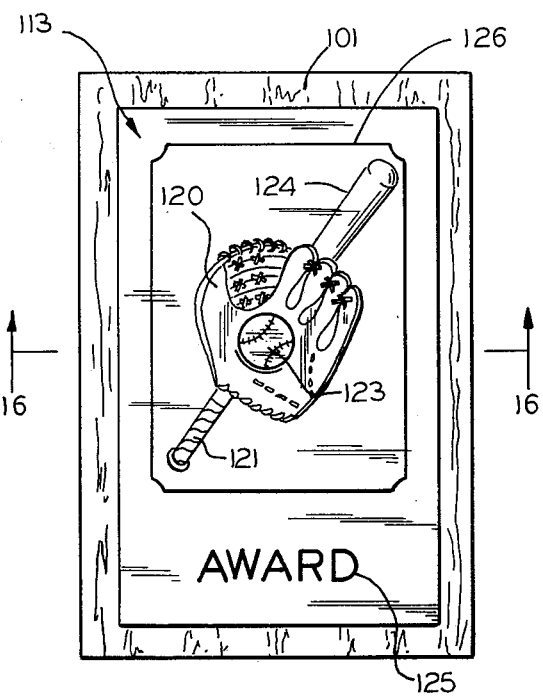
FIG. 15 is a similar plan view after completion of a debossing process explained by FIGS. 1–7.

The images 120, 121, 124 may be formed by any suitable die, such as a low cost zinc die made by a photographic etching process, which is well known in the printing art. For use at the point of sale, dies with any of many different standard logos may be ordered, at the retailer's option. For example, the retailer may buy a Little League baseball motif, as shown in FIG. 15. He may also buy patriotic, religious, civic, fraternal or organization symbols. Company logos, product symbols and would could be combined for a salesman's award. Many different unique one-of-a-kind plaques may be made in a low cost manner from stock dies. Of course, any desired special die may also be made. The plaque may be further personalized by setting type for the debossment, at 125, with individually selected messages (FIG. 15).

Since the plastic 44 flows under heat, it may be heated and extruded once, and then, within reason, reheated and reextruded in a different manner. Also, the ink which is deposited in one step may be covered by other ink in a later step. Therefore, further customization may be achieved by over-printing. Thus, for example, religious symbols may be printed over a corner of an earlier printed flag, and then a motto may be printed over both the religious symbol and the flag. In a similar manner, many other combinations and modifications may also be made to customize decorative and award plaques.

Figure 16:
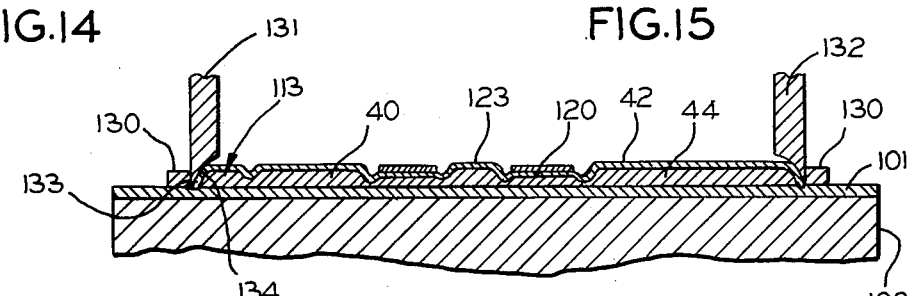
FIG. 16 is a cross-sectional view taken along line 16—16 of FIG. 15 and symbolically showing a die cutting technique.

The next step of the process is to trim the surface layer 113 to the desired size and shape, and to remove the resulting selvage 130, as shown in FIG. 16. As illustrated, a die (preferably a steel rule die) 131, 132 has blades which are sharpened on only one side to provide a straight edge 133 on the selvage side and a contoured edge 134 on the plaque side. If the contours were to be reversed with the straight edge on the plaque side, the plastic sheet 113 would be cut with a perpendicular edge 140 which could be caught and lifted by a fingernail. Therefore, it would be easy to catch and peel off the plastic sheet 113. Also, the laminated nature of the plastic 44 and film 42 is exposed to view at the vertical edge 140, and the illusion of a metal plate may be destroyed.

Figure 18:
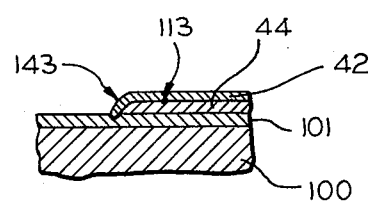
FIG. 18 is a fragmentary sectional view similar to FIG. 17, showing how the plaque is cut by the inventive process of FIG. 16.

To provide metallic appearance edge contours which cannot be caught by the fingernail, the straight side 133 of the die edge faces the selvage 130, as shown in FIG. 16. Then, the tip of the die edge cuts the surface film 42, the trailing die contour 134 rolls the underlying plastic 44 so that it becomes somewhat rounded. As the tip of the die penetrates and slits the wood grain vinyl 101, the metalic appearing film 42 is inserted into the vinyl as at 143 (FIG. 18). When the die is raised, the memory characteristics of the vinyl 101 causes the slit formed by the die edge to grip and hold the film.

Figure 19:
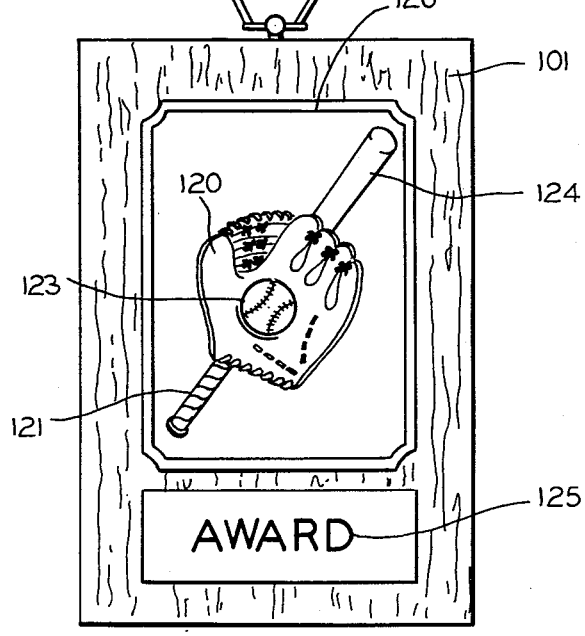
FIG. 19 is a plan view of a finished plaque made by the inventive process.

The selvage is then peeled off the plaque and the plaque is complete (FIG. 19). Any decorative hardware may be added, such as a hanger loop 145. Other hardware might include metal corners, frames, screws, rivets, or the like. An easel stand may be added to the back of the plaque.

Figure 17:
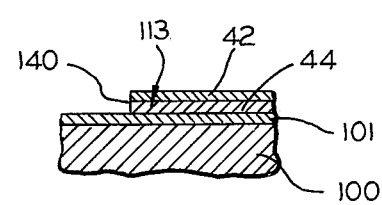
FIG. 17 is a fragmentary sectional view of the edge of a plaque cut by a conventional process.

A preferred production line would include a conveyor with a sequential plurality of work stations, each performing one of the steps shown in FIGS. 8-19. The order of some of the steps may be changed for desired effects. For example, the order of the successive hot-stamping processes of FIGS. 14 and 15 depends almost entirely upon the desired end product appearance. On the other hand, when the hot-stamping involves debossing, the underlying plastic 44 is extruded and surplus material must flow someplace. Therefore, there may be an extrusion of layer 44 at an edge of the film 42, such as 140 (FIG. 17). Therefore, it is important that the die-cutting step of FIG. 16 should follow the debossing steps. If the edge of layer 44 is rounded and confined by film 42 before debossment, the plastic in layer 44 might not extrude freely, and less than desired results might follow.

It is to be understood that the embodiments of the invention which have been described are merely illustrative of the application of the principles of the invention. Numerous modifications may be made by those skilled in the art; therefore the claims are to be construed to include all equivalent structures falling within the true spirit and scope of the invention.

I claim:

1. An article adapted to be imprinted by a hot-stamping process, said article being suitable for forming a wall plaque, comprising:
   (a) a rigid board-like background support material having upper and lower surfaces, at least one of which surfaces has a discrete decorative appearance;
   (b) a plastic laminated plate smaller than, and adhered to, the decorative surface of the support material, said laminate comprising a first relatively thick sheet of plastic material having heat deformable characteristics such that the material debosses under localized heat and pressure, and a second relatively thin sheet of a decorative plastic film coextensive therewith which conforms to said debossments when said first sheet is debossed; and
   (c) a hot stamping foil positioned over said decorative film, said hot-stamping foil containing on the surface adjacent the plastic laminate coloring matter which transfers and adheres to said decorative plastic film in said debossments when said film is debossed under localized heat and pressure.

2. The article of claim 1 wherein more than one hot-stamping foil is provided, said foils having contrasting coloring matter thereon.

3. The article of claim 1 wherein the heat deformable material is rigid polyvinyl chloride which debosses under heat and pressure and the decorative film is a polyester film which does not respond to the heat and pressure required to form said debossment.

4. A decorative plaque adapted to be imprinted by a hot-stamping process comprising;
   (a) a plaque blank of hard board-like material of predetermined area having at least one decorative surface with a desired size, shape and finish;
   (b) a laminate of a plastic film and a plastic plate, said plate adhered to said decorative surface of said board-like material, said plate having a heat deformable characteristic such that the plastic material of the plate debosses under localized heat and pressure and said overlying plastic film having a characteristic such that it contains the plastic of the plate during deformation and conforms to said debossments;
   (c) and a hot-stamping foil removably covering said laminate for forming a desired colored design on said laminate by applying heat and pressure to deboss said plastic material, said foil having coloring matter on the side thereof adjacent the plastic laminate which coloring matter is transferred to said debossments under said heat and pressure; and
   (d) said plastic laminate having been trimmed to a final shape having an area smaller than said predetermined area to expose at least some of said decorative surface around the periphery of said trimmed plastic laminate.

5. The plaque of claim 4 wherein said one decorative surface of said hard board-like material of said plaque blank is a laminated plastic layer, and the edges of said plaque blank are covered by a finish coating.

6. The plaque of claim 5 wherein said plastic sheet has been die cut with a straight vertical edge on the selvage side of the trimming cut, and the non-selvage edge of said plastic sheet is rolled and inserted into a groove slit into said decorative plastic layer of said plaque blank.

7. The plaque of claim 6 wherein said plastic plate comprises a thermoplastic material with a polyester film laminated thereto, said film being inserted into said slit during said trimming step.

8. The plaque of claim 4 wherein said formed plastic laminate includes at least one patch of contrasting color on the surface of said plastic film and debossed and colored lines on the surface of said plastic film.

9. The plaque of claim 8 wherein said debossed lines are formed in contrasting color and at least partially overlaps said patches of contrasting color.

10. The plaque of claim 9 wherein said hard board surface finish has a wood grain vinyl plastic coating, the edges of said plaque blank having a finish coating, said plastic plate comprises a thermoplastic sheet of material having a covering decorative film, the thermoplastic sheet being cut with a straight edge on the selvage side of the cut and a rolling cut on the edge of the thermoplastic sheet on the plaque side of the cut, said rolling cut being inserted into a slit in the vinyl plastic coating film of the board.

11. The plaque of claim 4 wherein said plastic plate comprises a thermoplastic material with a polyester film laminated thereto.

12. A product made by the process of:
 (a) forming a rigid background of substantial thickness, and a predetermined area;
 (b) forming on one surface of said board a finish having decorative qualities;
 (c) forming a laminate of a decorative plastic film covering a plastic plate, said laminate having an area which is smaller than said background board, said plastic plate having a heat deformable characteristic such that said plastic of said plate debosses under a predetermined localized heat and pressure, said plastic film laminated to said plate and being capable of conforming to the contours of said debossment while containing the flow of said plastic plate without said plastic film being damaged by said predetermined heat and pressure;
 (d) adhering said laminated plastic plate to said one surface, whereby the background finish is displayed to view in those areas which are not covered by said plate;
 (e) positioning over the laminated film on said plate an overlying, but separate, carrier film with a layer of coloring matter thereon and facing said laminated film, said covering matter being capable of transferring simultaneously with debossment to said decorative plastic film under said predetermined heat and pressure;
 (f) hot-stamping said plate with a heated die to simultaneously (1) deboss the plastic of the plate and cause the plastic film to form itself into the contours of the debossed plastic plate, and (2) transfer said coloring matter from said carrier film onto said laminated film in the debossed portions of the plate; and
 (g) removing the carrier film.

* * * * *

UNITED STATES PATENT AND TRADEMARK OFFICE
CERTIFICATE OF CORRECTION

PATENT NO. : 4,125,655
DATED : November 14, 1978
INVENTOR(S) : James C. Kanzelberger It is certified that error appears in the above-identified patent and that said Letters Patent are hereby corrected as shown below:

Column 4, line 40, "inche" should be --inch--

Column 5, lines 56,57, "suitably" should be --suitable--

Column 6, line 54, "would" should be --words--

Column 7, line 19, "appearance" should be --appearing--

Column 7, line 26, "metalic" should be --metallic--

Signed and Sealed this

First Day of May 1979

[SEAL]

Attest:

RUTH C. MASON
Attesting Officer

DONALD W. BANNER
Commissioner of Patents and Trademarks